United States Patent [19]

Letsch

[11] 4,240,587
[45] Dec. 23, 1980

[54] METHOD FOR RECYCLING TIRES AND SIMILARLY COMPOUNDED MATERIALS TO RECOVER USABLE CONSTITUENTS

[76] Inventor: Walter Letsch, Schützenstrasse 7, D-7470 Albstadt 1, Fed. Rep. of Germany

[21] Appl. No.: 911,206

[22] Filed: May 31, 1978

[30] Foreign Application Priority Data

Jun. 2, 1977 [DE] Fed. Rep. of Germany ....... 2724813

[51] Int. Cl.² .............................................. B02C 19/00
[52] U.S. Cl. .............................. 241/23; 241/DIG. 31; 241/DIG. 37
[58] Field of Search .............. 241/DIG. 31, DIG. 37, 241/23, 24, 25, 30

[56] References Cited

U.S. PATENT DOCUMENTS 4,025,990  5/1977  Lovetti, Jr. .................. 241/DIG. 31
4,081,143  3/1978  Johnson et al. ............. 241/DIG. 31

*Primary Examiner*—Richard B. Lazarus
*Attorney, Agent, or Firm*—Sam Meerkreebs

[57] ABSTRACT

A processing plant and method for processing scrap tires and similar materials containing a mixture of technical rubber, scrap metal and tire cord in which the plant is essentially vehicular and thus eliminates the necessity of hauling accumulated tires long distances with the accompanying costs; and the plant includes means for directing mixed tire sizes to a cyrogenic section where the technical rubber is reduced to a sufficient temperature making it brittle so that initial separation of reusable technical rubber is accomplished; the plant being operated essentially on the reusable by-products of pyrolytic reduction of the tires so that hydrocarbons and heated gas are utilized and additional commercial by-products such as commercial soots, metal and tire beads are obtained.

2 Claims, 4 Drawing Figures

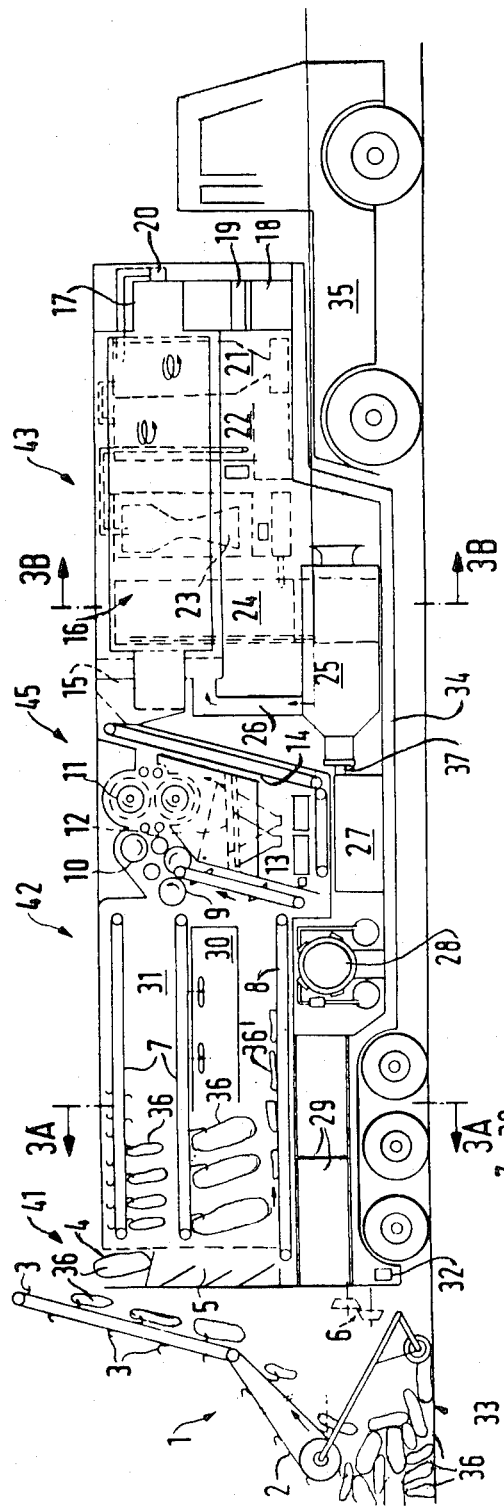
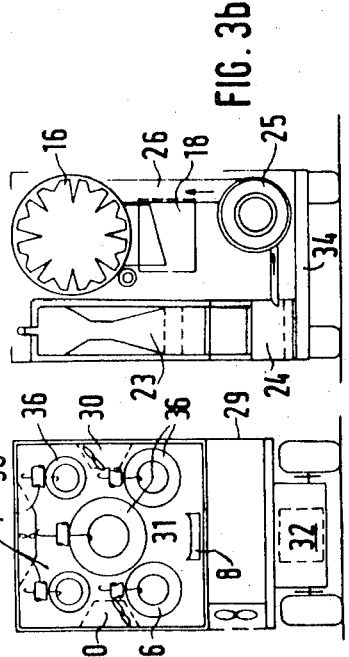
FIG. 2
FIG. 3a  FIG. 3b

METHOD FOR RECYCLING TIRES AND SIMILARLY COMPOUNDED MATERIALS TO RECOVER USABLE CONSTITUENTS

FIELD OF THE INVENTION

The instant invention concerns a plant and a method for the processing of the preparation of scrap materials primarily consisting of technical rubber, such as that of used tires, for example.

BACKGROUND OF THE INVENTION

A plant and a method in which used tires are broken into small particles at a substantially reduced temperature, is known from German Offenlegungsschrift 21 45 728 corresponding to U.S. Ser. No. 71,896, filed Sept. 14, 1970, now abandoned and assigned to the Union Carbide Corp. This prior art plant, and its method operates relatively inefficiently, since the processing of the used tires into rubber granulates, produces only about a 28% yield from tires of passenger vehicles, the remainder being cord fibers and scrap steel, and require a disproportionate consumption of energy for its reduction. The usuable products of separation in the form of the cord fibers and the scrap steel; to which adheres relatively large amounts of rubber, together contain large amounts of combustible materials. The remaining component parts, in the prior art, must be delivered to and disposed of in scrap yards which involves transportation costs and scrap yard storage fees.

SUMMARY OF THE INVENTION

A primary object of the present invention to provide a plant and a method of the above-described type with which the preparation of used tires, i.e., the separation of the reusable technical rubber, textile and/or metallic components is accomplished in an economical and efficient manner.

More particularly, the primary object of the invention is to provide a plant adapted to be vehicular in which scrap materials including a considerable portion of technical rubber are initially processed through a cyrogenic crushing and separation section during which a considerable amount of reusable technical rubber is mechanically separated, and thereafter the remainder is pyrolytically treated so that reusable technical by products are obtained while high-energy containing gases and oils are utilized in operation of the plant after it is started up.

It is possible by means of the instant invention to lower the costs for the recuperation of used tires to an acceptable minimum, since the energy required to operate the plant is obtained to a full extent from the pyrolysis of the remaining component parts after an essential portion of the reusable rubber is separated.

The pyrolysis in the utilization of used tires is in and of itself known in the art, however, the same is only utilized by itself and only for the purpose of producing energy and not for the purpose of producing rubber granulates.

In so far as the scrap material finds use to a full extent only as fuel material, the yields at the present time do not cover the costs, since for the resulting pyrolysis oil and the pyrolysis coke, there is no special market available, and additionally the coke does not reach the quality of industrially-produced soots. In contrast thereto, rubber granulate is utilizable in a variety of ways; these are considerations of reprocessing used tires to receive reusable constituents which enter into the calculation of economics.

In a preferred embodiment of the present invention, the entire plant is arranged vehicular, i.e. mounted on a vehicle chassis. This has substantial advantages since the entire plant is thus movable and is utilizable any place there is an accumulation of tires. The mobility is possible by being practically self-supportive; and reduces substantially the cost which otherwise would be incurred for the transportation and the storage of the scrap material at a central scrap yard having a stationary (fixed) reprocessing plant.

According to a further preferred embodiment of the present invention, the plant operates with a cooling tunnel in the cycle method with conventional compression-cooling aggregates, which are activated by means of a gas turbine. Prior art installations, in which the cold-crushing method has been used, operated with liquid nitrogen or the like, whereby the scrap materials are brought into immediate contact with this cooling agent. This is a very high energy expenditure, expensive and extremely low temperatures are not absolutely necessary, since the scrap material need only be cooled to an extent where the rubber component, and not the metal, becomes brittle. Additionally this is a substantial step forward in the art, since prior art installations each had to be supplied with the liquid coolants by means of special instrumentalities.

Further details and embodiments of the present invention will become apparent from the following description when taken with the drawing, in which the invention is disclosed by means of an exemplary embodiment wherein:

BRIEF DESCRIPTION OF THE FIGURES OF THE DRAWINGS

FIG. 2 schematically illustrates the plant installed on a vehicle, according to one embodiment of the present invention; and FIGS. 3a and 3b are schematic crosssections along the lines 3a—3a or 3b—3b respectively.

DESCRIPTION OF A PREFERRED EMBODIMENT

Figure 1:
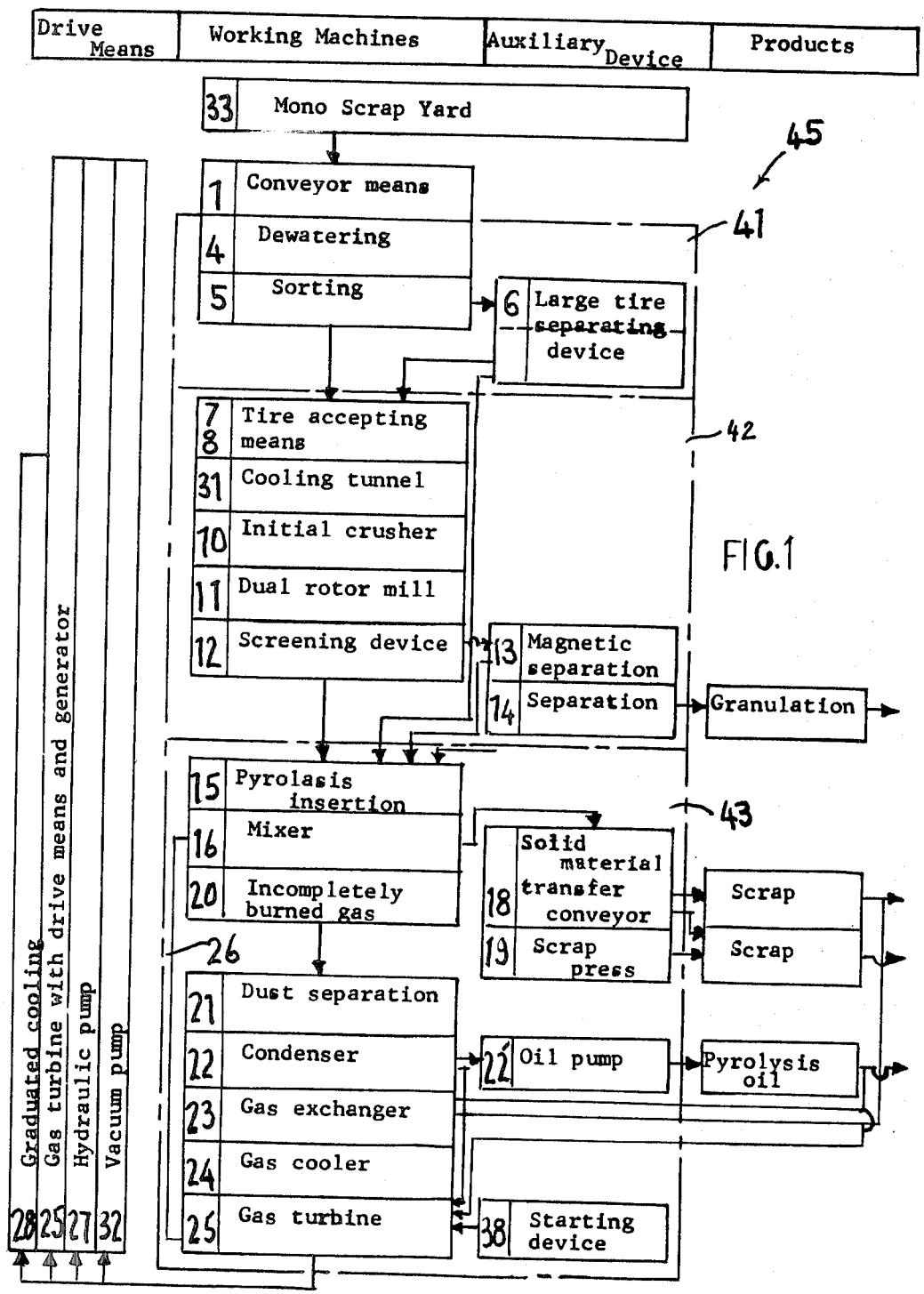
FIG. 1 illustrates a schematic flow diagram which shows the cycle of the novel method.

In FIG. 1 there is illustrated schematically, the novel method for the preparation of used tires, comprising a combined cryogenic and pyrolytic system, so that component parts of the used tires or similar scrap materials consisting technical rubber, can be re-used on an economical basis.

In FIG. 2 a vehicular plant 45, is mounted on a semitrailer 34 drawn by a tractor vehicle 35. The plant comprises, in general, of working machines, components operating to effect the preparation, processing and treatment of the used tires 36 and the resultant components parts. Various mechanically-operated components are power-driven and function with auxiliary devices which substantially effect separation of materials, and in many cases, effect preparation of the component parts and usable products.

First, the method will be considered; from a monoscrap yards 33, used tires are moved through a conveyor device 1, which, for example, includes an endless chain-conveyor means 2, which travels over the surface area of a randomly-deposited pile of tires 36, and guides the tires to an initial treating device 41. In an adjacent dewatering device 4, the tires 36, which are generally filled with water, are dried by means of a vacuum pump and/or by means of warm air. Downstream of the dewatering device 4 is a sorting device 5, in which the used tires 36 are sorted according to their diameter and/or weight into, for example, five major sizes and one oversize.

The major sizes of the used tires 36 are guided via shafts to tire-receiving means of a cryogenic device 42. The sorted tires 36 with over-sizes are first guided to a separating device 6 for oversized tires, from where they also move to the cryogenic device 42, however, in pieces. The large tires, which, eventhough being small in numbers, represent, however, a high rubber granulate yield, then have the rims (beads) and edges removed between two hydraulically-operated toothed cutting disks which are located in the separating device 6, and the carcasses are separated into pieces 36'. The individual cover-or-carcass pieces 36' of the large tires, as mentioned above, are guided to receiving means 8. The "normal" sized tires 36 of varying sizes and/or weights and the pieces 36' of the large tires are then moved in a tire-receiver to, for example, chain-conveyor means 7 or 8, which runs through a cooling tunnel 31 of the cryogenic device 42 at optimally determined varying speeds. The larger the used tire 36 or the thicker the mantle of the used tire, the slower movement the chain conveyor 7, 8 through the cooling tunnel 31 so that the entire scrap material moving through this cooling tunnel is evenly cooled to about −80° C. This timed optimum tunnel penetration permits an optimum utilization of the tunnel volume and an even temperature-reduction of both thin-walled and thick-walled tires 36 and tire portions 36'. The cooling tunnel 31 is arranged with conventional compression cooling aggregates 28 and heat exchangers 29 and 30, which produce the low temperature in the tunnel 31. The tunnel is thus not being operated by the utilization of a direct-contact coolant means, such as, for example, liquid nitrogen, as is the case in prior art installations, in which the parts of tires cut into small pieces are directly subjected to the liquid nitrogen, so that, under some circumstances, the tires are reduced to very low temperatures of, for example, about −190° C. in the border zones, while in the center they barely reach the breaking point temperature, since the materials are subjected to the liquid nitrogen for only a short period of time. In contrast to this, on the present invention, steel and fibers are still above the fracture point, which has a decisive effect on the further breaking down and the separation of the tires and the technical rubber component particles and metal and/or cord-fiber particles.

The now undercooled tires 36 and tire pieces 36' are guided to a primary rubber-crusher 10 by means of feed rolls 9, whereby said initial rubber crusher may consist of a jointed roller frame, where only the rubber of the tires 36 or tire pieces 36' are initially crushed in such a manner so that the rubber is loosened from the steel, i.e., from the rim beads.

A dual-rotor, hammer mill 11 is coupled to the initial crushing means 10, which knocks the rubber particles from the carcasses. The carcass particles which are pulled over the feed-in rollers and the rubber particles which have been knocked off are guided down into a screening portion 12, where the rubber particles are sifted out into, for example, three different core sizes. The sifted rubber granulate is being deposited into suitable containers by means of magnetic separaters 13 and a device 14 in which the remaining metal particles or cord threads are separated. The carcass portions, comprising rim threads, steel belts, and cord fibers, are guided to the pyrolysis device 43.

The pyrolysis device 43 is provided with a rotatable reduction cylinder 16 which is indirectly heated and toothed at its inner area, and which consists of sheet metal; the remaining component parts of the tires from the devices 6, 12, 13 and 14 are introduced into said cylinder 16 via a pyrolysis input 15 in the form of a pusher and are degasified therein at about 450°–500° C.

The solid residue is produced due to reduction is discharged out of the cylinder 16 past a pivoted damper 17 and is mechanically and/or magnetically separated into high-grade steel wire scrap and pyrolysis soot by means of a solid material separator 18, whereby the scrap steel may be guided to a scrap press 19. The scrap steel which is available either in pressed small pieces and/or as a complete rim wire bead ring, may be utilized for various future purposes. Whereby, especially the entire rim wire rings, may be re-utilized in new tires, as they are neither mechanically nor thermically damaged, since the pyroslysis temperature of 450° C. effects only an unimportantly low reduction of resistence in the rim threads. The soot further produced during the pyrolysis, for example, coke, may either be utilized in the preparation of products such as technical soots, printing inks, and phosphate-binders for the purification of waste waters, or, it may be utilized immediately as a fuel, such as, for example, in the disclosed reduction plant, whereby it is guided to a gas-changer 23 of the pyrolysis device 43.

The incompletely-burned gas, which is produced in the reducing cylinder 16 is continuously drawn off under a low underpressure via a drain 20, and is directed into a dust-separator 21, which may, for example, be a cyclone, and is therein cleared of the flue dust. The incompletely burned gas is cooled in a condensor 22 to such a degree so that the high-boiling hydrocarbons are condensed at an oil pump 22' which is located in said condensor. The condensor 22 or the pump device 22' is sprayed with the cooled pyrolysis oil which develops through condensation, in order to promote the condensation. The total energy requirement of the plant 45 determines thereby the condensor temperature and therewith the position of the remaining pyrolysis oil. The remaining pyrolysis oil may either be further utilized as an initial component for chemical compounds, such as a lubricant, and the like, or it may be guided to the pyrolysis device 43 as a fuel and/or a propellant means.

The remaining incompletely burned gas or pyrolysis gas, which in general substantially consists of hydrogen, carbon monoxide, methane and nitrogen, is utilized for the direct operation of a gas turbine 25, whereby this gas may be guided either directly or via a gas changer 23 and a gas cooler 24. A substantial portion of the gas for the gas turbine 25 represents the immediately yielded pyrolysis gas, while the gases yielded from the pyrolysis soot in the gas changer 23 and the oil represent only an additional by-product.

The gas turbine 25 operates in the prior art manner, i.e., a largest possible portion of the enthalpy of the pyrolysis gases is converted into mechanical energy, which is taken from the output shaft 37 of the gas turbine 25. The exhaust gases from the gas turbine 25 are guided back via path 26 to the reduction, rotatable cylinder 16 and deliver heating energy for the degasification of the remaining portions of the tires delivered from the cryogenic device 42.

The mechanical energy of the gas turbine 25 on one hand is utilized for the operation of the cooling tunnel 31, namely, for activating the compressors of the cooling aggregates 28 and 30, and on the other hand for the activation of pumps 27, the motors and the control of the entire plant 45, whereby these elements in the exemplary embodiment substantially operate hydraulically.

Thus, by means of the power from the gas turbine operation of the the following is effected pull-off device 1, the vacuum pump 32, the de-watering device 4, the cutters of the separating means 6, the activator of the sorting device 5, the conveyor-belts or conveyor chains 7 and 8 in the cooling tunnel 31, the initial crusher means 10, the hammer mill 11, the separators 12 and 14, the reduction cylinder 16, the cyclone separator 21 and the like. On the shaft 37 of the gas turbine 25 may possibly also be arranged a generator, which can deliver electric energy for certain parts of the installation 41. To conserve energy, there is furthermore used a warm-air flow from the heat exchangers 29, 30, the cooling tunnel 31 for drying the tires, and the remaining collant of the rubber granulate is utilized for the cooling of the pyrolysis oil.

For the starting up the initial treating portion 41, there is provided a start-device 38 by which the gas turbine 25 is being activated in order to operate the drives for the plant 45 and the diverse heating elements. The starter device 38 is preferably the Diesel engine of the tractor vehicle 35, whereby the installation 41 is completely mounted on the semi-trailer 34.

As seen in FIG. 2, an embodiment of the inventive installation 41 is shown as a transportable plant, being mounted on the semi-trailer 34 of the tractor motor vehicle 35. According to this figure, the chain conveyor 2 of the pull-up device 1 is fastened to the end portion of said semi-trainer 34 and pulls the used tires 36 individually from the pile of the mono scrap yard 33. This pulling off may be semiautomatic or fully automatic is so far as the vehicle 35 moves along the pile of used tires and/or the conveyor chain can be respectively tilted by one revolution. From the pull-off device 1, the used tires 36 move continuously individually into the initial treatment device 41 and from there they move into the cryogenic device 42. The rubber granulate can immediately be packed in containers, while the remaining component parts are guided into the pyrolysis device 43 for gasification, on which additional by-products, such as pyrolysis soot, pyrolysis oil and scrap steel are separated and packed up. The gas turbine 25 of the pyrolysis device 16 is connected with the engine of the motor vehicle 35 in such a manner, not illustrated, for example whereby the engine exhausts guided over a condensor are supplied to the gas turbine.

What I claim is:

1. The method of recovering reusable portions of used tires and similar rubber-compounded scrap materials containing technical rubber, metal and cord, comprising the steps of:
   A. supplying scrap material primarily comprising used tires and portions thereof to a cyrogenic treatment section of a vehicular plant;
   B. substantially, uniformly cooling the scrap material, by using cyrogenic gases to a relatively minimum temperature at which the scrap can be crushed and recoverable-granulates can be formed;
   C. crushing the scrap material and separating rubber granulates and forming a residue comprising the remaining scrap including a mixture of rubber adhering to metal, metal beads and belts, cords comprising both synthetic and natural fibers;
   D. pyrolytically-reducing the residue and producing incompletely burned, high-energy gases, including hydrocarbons, soots and scrap metal;
   E. separating the scrap metal and soots; and
   F. condensing said high energy gases and recovering a pyrolytic oil and operating a power plant with a portion of the gases and converting the gas energy to mechanical energy and operating conveying, cooling, crushing and separating components of said plant.

2. The method of claim 1 including the step of salvaging the exhaust gases from the power plant heat to pyrolytically assist to reduce the residue, for salvaging heat generated by the power plant.

* * * * *